No. 884,642.  
PATENTED APR. 14, 1908.

R. E. COAD.  
LUMBER LOADING DEVICE.  
APPLICATION FILED OCT. 2, 1907.

Witnesses  
A. J. McCauley  
Nellis L. Ohmer

Inventor:  
Raymond E. Coad  
by Bakewell & Cornwell  
Attys.

THE NORRIS PETERS CO., WASHINGTON, D. C.

UNITED STATES PATENT OFFICE.

RAYMOND E. COAD, OF OMAHA, NEBRASKA.

LUMBER-LOADING DEVICE.

No. 884,642.

Specification of Letters Patent.

Patented April 14, 1908.

Application filed October 2, 1907. Serial No. 395,640.

*To all whom it may concern:*

Be it known that I, RAYMOND E. COAD, a citizen of the United States, residing at Omaha, Nebraska, have invented a certain new and useful Improvement in Lumber-Loading Devices, of which the following is a full, clear, and exact description, such as will enable others skilled in the art to which it appertains to make and use the same, reference being had to the accompanying drawings, forming part of this specification, in which—

Figure 1:
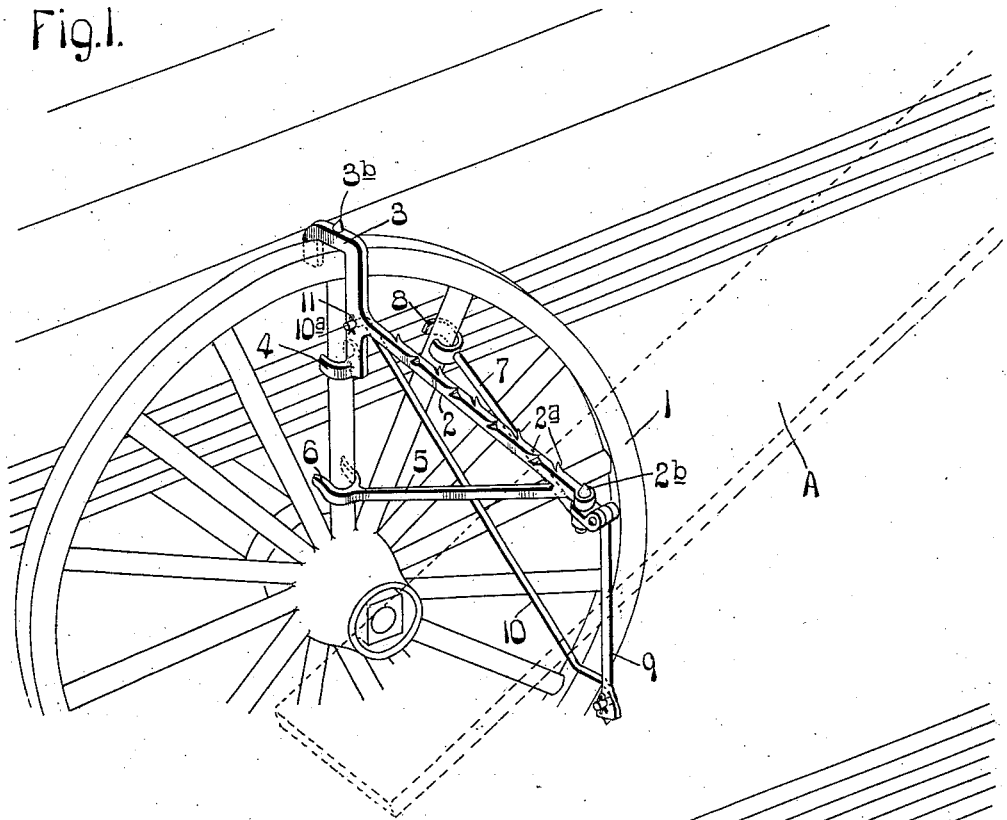
Figure 2:
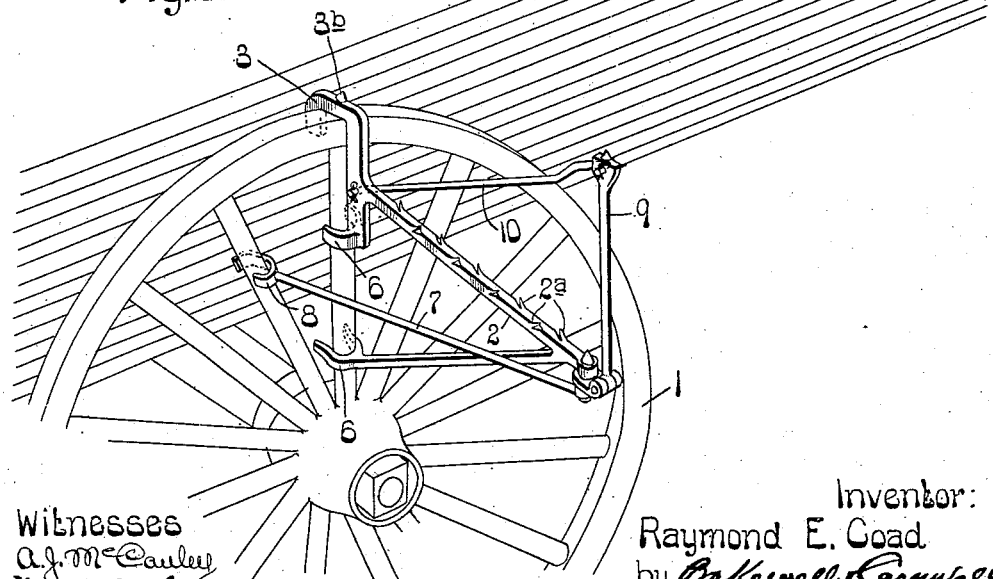

Figure 1 is a perspective view showing my device in operative position on the wheel of a vehicle; and Fig. 2 is a view similar to Fig. 1 but with the parts of the device arranged in a different position.

This invention relates to devices that are used for piling and unpiling lumber.

Briefly described, my invention consists of a device that is adapted to be connected to the wheel of a vehicle and which is provided with a member that projects laterally from said wheel to serve as a fulcrum for a piece of lumber that is to be swung onto the vehicle or removed from the vehicle.

Referring to the drawings which illustrate the preferred form of my invention, 1 designates the wheel of a vehicle and 2 a member that projects laterally from said wheel and which is provided at its inner end with a hook 3 that extends over the rim of the wheel and engages the inside face of the felly thereof, said member 2 also being provided at its inner end with a jaw 4 that embraces one of the spokes of the wheel. Said member 2 is preferably strengthened and prevented from being deflected downwardly when a load is applied thereto, by means of an inclined brace 5 connected at its outer end to the member 2 and provided at its inner end with a jaw 6 that embraces the same spoke which the jaw 4 embraces.

For preventing the member 2 from swinging sidewise I use a guide rod 7 that is pivotally connected at its outer end to said member and which is provided at its inner end with a swiveled jaw 8 that embraces one of the spokes of the wheel, as shown in Fig. 1, preferably the spoke that is adjacent to the one which the jaws 4 and 6 embrace. The upper edge of the member 2 is provided with teeth 2ª to form a serrated or roughened surface so that when the member 2 is used as a fulcrum for a piece of lumber A that is being swung onto or off from the vehicle, said serrated surface will prevent the piece of lumber from slipping. Preferably, the member 2 is provided at its extremity with a pointed lug or upwardly projecting pin 2ᵇ and the hooked portion 3 of the device is also provided with a pointed lug 3ᵇ, thereby enabling the piece of lumber to be fulcrumed or rested at various distances from the pile onto which it is being placed or removed from.

My device also comprises an auxiliary fulcrum member consisting of a standard 9 pivotally connected at its inner end to the extremity of the member 2 and provided with a guide rod 10 having a bent end or extension 10ª that passes through an opening at the inner end of the member 2, a cotter pin 11 passing through a hole in the extension 10ª to hold the guide rod in position. This auxiliary fulcrum member is only used when lumber is being placed on or removed from a high pile and when said device is in operative position, as shown in Fig. 2, the member 2 is not used as a fulcrum or rest. Fig. 1 shows the auxiliary fulcrum member in inoperative position, the standard 9 projecting downwardly from the member 2 and being retained in this position by the guide rod 10. When it is desired to use said auxiliary member, the cotter pin in the inner end or extension of the guide rod 10 is removed, and the standard 9 is then swung upwardly into the position shown in Fig. 2, the inner end of the rod 10 being thereafter inserted in its opening in the member 2 and the cotter pin placed in position. By using a pivotal connection between the member 2 and the rod 7 which prevents it from moving sidewise, I am able to position said rod on either side of the member 2 so that it can always be arranged oppositely or in front of the person who is loading or unloading the lumber, thereby enabling the person to stand very close to the member 2, Fig. 1 showing said rod 7 arranged at one side of the member 2 and Fig. 2 showing said rod arranged at the opposite side of said member.

A device of the character above described greatly reduces the labor of loading or unloading lumber and enables one man to handle pieces of lumber which heretofore required the labor of two men. Another advantage of this device is that two or more pieces of lumber can be handled at the same time, for as there is no possibility of the underneath piece slipping when it is resting on one of the fulcrum members, the superimposed pieces will not shift or be disarranged. As the fulcrum member 2 is so securely braced and anchored in position, it is capable of supporting great loads without liability of being deflected downwardly or sidewise.

The members which form my device are preferably made of metal and while I have herein illustrated the fulcrum member 2 as being strengthened by an inclined brace 5 and connected to the wheel by the hook-shaped member 3, it will, of course, be understood that various changes could be made in the construction of the device without departing from the spirit of my invention.

Having thus described my invention, what I claim as new and desire to secure by Letters Patent is:

1. A device of the character described, comprising a fulcrum member provided with means for engaging the rim and a spoke of a vehicle wheel, and a part connected to said member and provided with a jaw for engaging a different spoke of said wheel to retain said member in position; substantially as described.

2. A device of the character described, comprising a fulcrum member provided at its inner end with a hook for engaging the rim of a wheel, a jaw for engaging one of the spokes of said wheel, an inclined brace provided at its inner end with a jaw for engaging said spoke, and a guide rod pivotally connected to the outer end of said member and provided at its inner end with a jaw which engages a different spoke of said wheel; substantially as described.

3. A device of the character described, comprising a bar having a serrated edge and provided at its inner end with a hook which passes over the rim of a wheel and also a jaw arranged in alinement with said hook for engaging one of the spokes of said wheel, an inclined brace connected to said bar and provided with means for engaging said spoke, and means for preventing said bar from moving sidewise; substantially as described.

4. A device of the character described, comprising a fulcrum member provided at its inner end with means for engaging the rim, and one of the spokes of a vehicle wheel, and a guide rod pivotally connected to said member and provided at its inner end with a swiveled jaw for engaging a different spoke of said wheel; substantially as described.

5. A device of the character described, comprising a fulcrum member which is adapted to be detachably connected to a vehicle wheel, a standard pivotally connected to the outer end of said member to form an auxiliary fulcrum member, and means for holding said standard in operative position; substantially as described.

6. A device of the character described, comprising a bar provided at its inner end with a part which hooks over the rim of a wheel and with means for engaging one of the spokes of said wheel, means for preventing said bar from moving sidewise, a standard pivotally connected to the outer end of said bar, and a rod secured to said standard and detachably connected at its inner end to said bar for holding said standard in position; substantially as described.

7. A device of the character described, comprising a fulcrum member provided at its inner end with a hook for engaging the rim of a wheel, and a rigid jaw for engaging one of the spokes of said wheel; substantially as described.

8. A device of the character described, comprising an approximately straight bar provided at its inner end with a rigid jaw for engaging one of the spokes of a wheel, and a hook for engaging the rim of said wheel; substantially as described.

9. A device of the character described, comprising a bar provided at its inner end with a hook which passes over the rim of a wheel and a rigid jaw arranged in alinement with said hook for engaging one of the spokes of said wheel, a standard pivotally connected to the outer end of said bar, and means for holding said standard in an elevated position; substantially as described.

In testimony whereof I hereunto affix my signature in the presence of two witnesses, this 28th day of September 1907.

RAYMOND E. COAD.

Witnesses:
    WELLS L. CHURCH,
    GEORGE BAKEWELL.